United States Patent Office 3,300,559
Patented Jan. 24, 1967

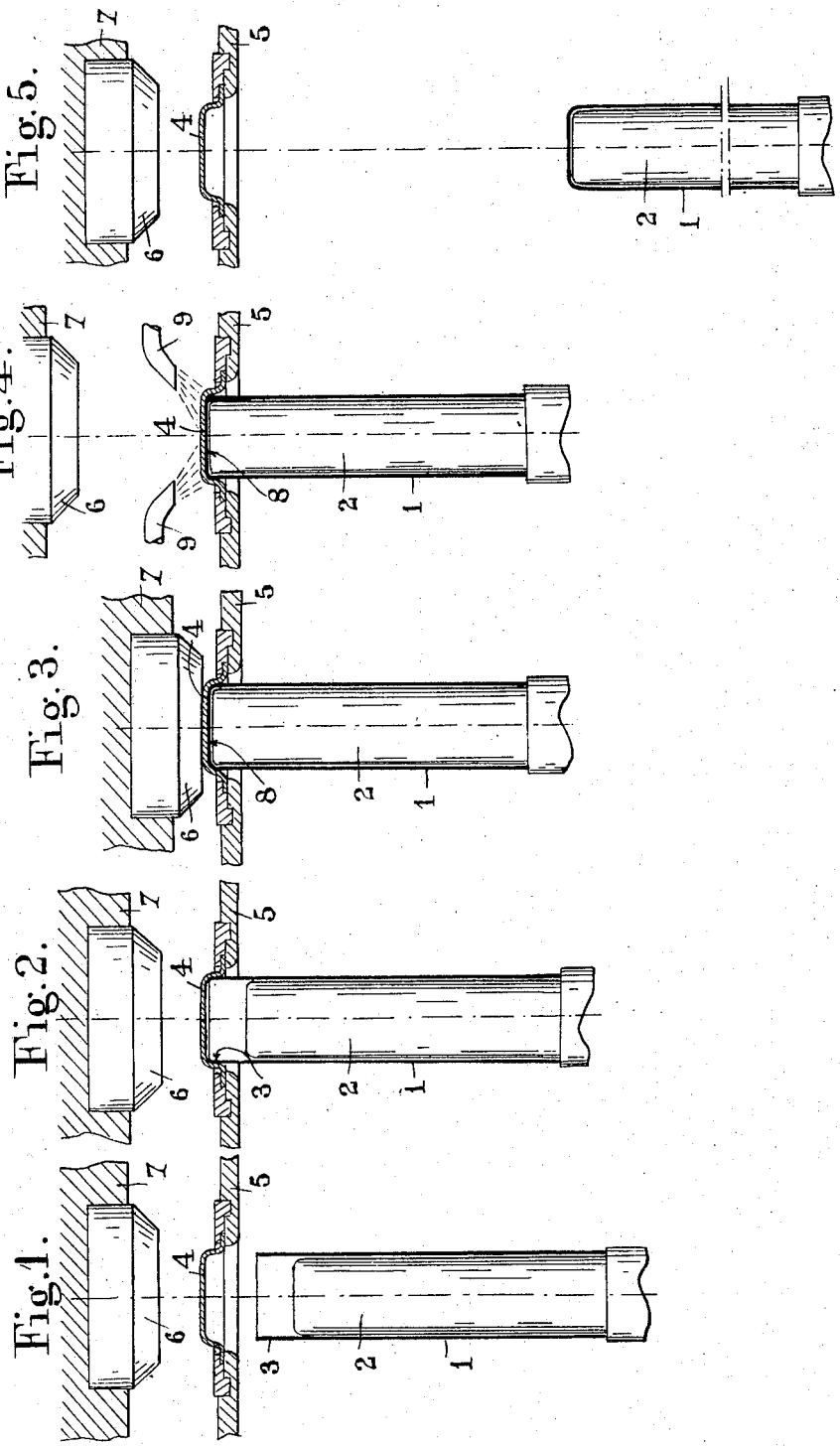

3,300,559
METHOD FOR FORMING PLASTIC
TUBE BOTTOMS
Michel Baehr, 108 Rue de Flandre, Paris, France
Filed July 8, 1963, Ser. No. 293,370
Claims priority, application France, May 28, 1962,
898,951, Patent 1,334,991
3 Claims. (Cl. 264—323)

This application is a continuation-in-part of my application Serial No. 283,794, filed May 28, 1963, now abandoned.

This invention relates to the manufacture of plastic tubes having a closed bottom and an open neck or end is effected as a rule by cutting a continuous tube into sections of a given length and securing by welding on one end of each tube section a disc constituting the closed bottom thereof, the welding step being carried out according to a known instantaneous heating process. However, this manufacture is attended by the drawback of requiring several steps, namely cutting the tube into sections, positioning the bottom-forming disc, welding and cooling.

In order to improve this prior manufacturing method, it has already been proposed to close the tube bottom by softening one end of the plastic tube, flattening the softened tube end inwardly in a die or adequate configuration, welding the thus flanged material by heating the die to the melting point of the plastic material and finally compressing the thus prepared tube bottom by bending the tube walls by means of a piston.

Another known method consists in preforming the bottom of a blank tube obtained by sectioning an extruded tube, bending the tube wall along a predetermined height thereof inside a suitably shaped impression having its walls heated to the melting point of the plastic tube, and subsequently equalizing the pleated bottom thus obtained by applying a high-frequency or induction heating thereto. However, this method is not much in favor due to the inconveniences characterizing high-frequency or induction heating.

It is the chief object of this invention to provide an improved and novel method of forming a closed bottom in an open-neck plastic tube, which comprises the steps of simultaneously shaping and integrating the bottom by folding or bending, flattening or shaping and welding or integrating the tube end in a simple and same operation by applying instantaneously and under pressure said tube end against a heated inner surface of the bottom of a shaping cup of low thermal inertia, heated by contact at the proper time with a pressure block heated to a temperature for integrating the shaped plastic material of the tube into a finished, shaped bottom.

This method of manufacture, although it requires a longer time per unit than the induction heating method, affords a considerably higher output due to the possibility of using one or more series of presser blocks, cups and tube-carrying mandrels. The method of this invention is free of any risk of faulty operation, since the welding time can be calculated according to the type of plastic material constituting the tube and to the temperature of the presser blocks. The shaping cups can be cooled down very rapidly after they are moved away from the heating blocks, by properly selecting the cup material which is preferably of a low thermal inertia or high heat transfer coefficient type, such as stainless steel, aluminum, brass, copper or the like, but other materials may be used.

The shape of the cup may also vary as a function of the tube diameter and the desired bottom configuration.

The presser blocks may be heated electrically, by gas or from any other suitable source of heat.

In order to afford a clearer understanding of this invention and of the manner in which the same way may be carried out in practice, the different steps of the method of manufacturing plastic tube bottoms according to this invention will now be described with reference to the attached drawing illustrating diagrammatically a typical form of embodiment of the method and means of this invention. In the drawing, all the figures are fragmentary vertical axial sections showing:

FIGURE 1, the plastic tube mounted on a mandrel, before its engagement with the shaping cup;
FIGURE 2, the initial engagement between the plastic tube and the cup;
FIGURE 3, the heat shaping step proper;
FIGURE 4, the cooling of the shaping cup; and
FIGURE 5, the ejection of the finished tube.

More particularly, the plastic tube section or blank 1 cut beforehand to a length slightly in excess of the desired final length is threaded on its mandrel 2, its free, open end portion 3 projecting from the corresponding mandrel end to a certain extent sufficient to constitute the bottom material (FIG. 1).

The cup 4 made from a material of low thermal inertia and having a shape corresponding to the desired bottom contour (flat, convex, tapered, multi-sided, etc.), is secured preferably detachably on a supporting plate 5 concentric with an overlying presser block 6 projecting from the underface of a frame or like supporting structure 7 of the machine, said presser block being heated by adequate means (not shown).

In the next step (FIG. 2) the mandrel 2 raises the tube section 1 into the mouth of the cup until its top 3 engages inner surfaces of the cup 4; then the heated presser block 6 is lowered for engagement with the top face or outer surface of the bottom of the cup 4, and due to the thin cross section of the bottom and its low thermal inertia the cup 4 is rapidly heated to the temperature corresponding to the point of plasticity of the plastic tube end portion 3 (FIG. 3).

During a time depending on the temperature, the type of plastic material used and the tube diameter, the tube end engaged by the cup 4 constantly pressed against the presser block 6 melts and the plastic material is shaped or flattened, thus lining the inner wall of the cup to constitute the tube bottom 8.

Upon completion of the molding or shaping step the presser block 6 is raised and cooling means, for instance in the form of nozzle 9 blowing cold air toward the cup, are operated for jointly cooling the cup and setting the formed tube bottom. During this cooling step (FIG. 4), the tube bottom is detached from the cup and upon completion of this cooling step the tube 2 can be removed from the mandrel 1 as the latter is lowered (FIG. 5).

The method and apparatus according to the invention is applicable to tubes of various plastic materials and dimensions. For example, tubes made of polyvinyl chloride, polyethylene or polypropylene having a thickness in the order of one to about 0.5 millimeter may be closed by using a shaping cup of stainless steel. The cup is applied to the end of the tube to be sealed for about 0.5 to three seconds under pressure of about 140 to 450 p.s.i. The heating presser block or tool heating the shaping cup is applied at a temperature of about 270° C. to about 300° C. The sealed tube end is cooled by applying a jet of a suitable cold fluid thereto for about two to four seconds to cool it to a temperature of about 30° C. to about 80° C. in dependence upon the material employed.

The means illustrated in diagrammatic form in the drawing and described hereinabove are given by way of example, but it would not constitute a departure from the basic principles of this invention to provide a tube bottom forming unit comprising stationary presser blocks and mandrels movable in two time periods; thus, during the first time period the tube end moves toward the cup until it is capped thereby, and during the second time period the tube and cup assembly is pressed upwards against the heated block.

Similarly, the means for heating the presser block or like member, positioning the cups, as well as the cooling and ejection means are not shown and described herein, since they will readily occur to anybody conversant with the art. The essential feature of this invention consisting in shaping the tube bottom by bending a free end portion of an open ended thermoplastic, deformable, plastic tube inwardly toward the axis of the tube, shaping and integrating the tube end material in suitably shaped, interchangeable, low thermal inertia cups, heated to the proper temperature for shaping and integrating the plastic defining the bottom and subsequently cooled at a relatively fast rate for separating the tube bottom and ejecting the finished tube, all of these steps being combined into a single shaping and integration operation.

As already suggested, the cups may be made from materials other than metal, any other material having the requisite properties.

It is clear that a machine for carrying out the method of this invention may comprise a considerable number of tube-bottom shaping stations each equipped with a mandrel, a cup carrier and a heated pressure block, these stations being controlled separately or in series.

What I claim is:

1. Method of manufacturing from an open-ended plastic tube a plastic tube having a bottom and an open end without using additional material for forming the bottom, which consists of, providing an open-ended tube of deformable, thermoplastic material, and simultaneously bending and shaping a free end portion of the open-ended tube inwardly toward the axis of said tube, and integrating the inwardly bent material into a whole defining said bottom by inserting said open end portion into an open mouth of a shaping cup having a heated bottom having a thin cross section and of high heat transfer coefficient and applying relative movement and pressure between the inner surfaces of said cup comprising a heated bottom inner surface of the shaping cup and said open end portion of said tube for substantially instantaneously shaping and heating said plastic material to integrate it into said whole, rapidly cooling said cup bottom subsequent to the tube shaping and integrating operation while still in contact with said shaped material, and relatively separating said plastic tube and said cup to a position where said plastic tube is free of said cup.

2. Method of manufacturing from an open-ended plastic tube a plastic tube having a bottom and an open end and without using additional material for forming the bottom, which consists of, providing an open-ended tube of deformable, thermoplastic material, and simultaneously bending and shaping a free end portion of the open-ended tube inwardly toward the axis of said tube, and integrating the inwardly bent material into a whole defining said bottom by inserting said open end portion into an open mouth of a shaping cup having a heated bottom having a thin cross section and of high heat transfer coefficient and applying relative movement and pressure between the inner surfaces of said cup comprising heated bottom inner surface of the shaping cup and said open end portion of said tube for substantially instantaneously shaping and heating said plastic material to integrate it into said whole, rapidly cooling the shaped material subsequent to the tube shaping and integrating operation while still in contact with said cup bottom, and relatively separating said plastic tube and said cup to a position where said plastic tube is free of said cup.

3. Method of manufacturing from an open-ended plastic tube a plastic tube having a bottom and an open end and without using additional material for forming the bottom, which consists of, providing an open-ended tube of deformable, thermoplastic material, and simultaneously bending and shaping a free end portion of the open-ended tube inwardly toward the axis of said tube, and integrating the inwardly bent material into a whole defining said bottom by inserting said open end portion into an open mouth of a shaping cup having a heated bottom having a thin cross section and of high heat transfer coefficient and applying relative movement and pressure between the inner surfaces of said cup comprising a heated bottom inner surface of the shaping cup and said open end portion of said tube for substantially instantaneously shaping and heating said plastic material to integrate it into said whole, heating said cup bottom while applying said relative movement and pressure, rapidly cooling said cup bottom subsequent to the tube shaping and integrating operation while still in contact with said shaped material, and relatively separating said plastic tube and said cup to a position where said plastic tube is free of said cup.

References Cited by the Examiner
UNITED STATES PATENTS

| 2,532,844 | 12/1950 | Hulbert. |
| 2,725,597 | 12/1955 | Douglass. |
| 2,876,496 | 3/1959 | Murphy. |
| 2,972,781 | 2/1961 | Levy. |
| 3,093,526 | 6/1963 | Price et al. _____ 264—249 XR |

FOREIGN PATENTS

| 752,221 | 7/1956 | Great Britain. |

ROBERT F. WHITE, *Primary Examiner.*

LESLIE GASTON, ALEXANDER H. BRODMERKEL,
*Examiners.*

M. R. DOWLING, J. A. FINLAYSON,
*Assistant Examiners.*